US012159297B2

(12) United States Patent
Chandrashekar et al.

(10) Patent No.: US 12,159,297 B2
(45) Date of Patent: Dec. 3, 2024

(54) SYSTEMS AND METHODS FOR TARGETING ADVERTISEMENTS BASED ON CONVERSATIONS

(71) Applicant: Adeia Guides Inc., San Jose, CA (US)

(72) Inventors: Padmassri Chandrashekar, Karnataka (IN); Daina Emmanuel, Bangalore (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/382,750

(22) Filed: Jul. 22, 2021

(65) Prior Publication Data
US 2023/0025304 A1 Jan. 26, 2023

(51) Int. Cl.
*G06Q 30/00* (2023.01)
*G06Q 30/0251* (2023.01)

(52) U.S. Cl.
CPC .............................. *G06Q 30/0251* (2013.01)

(58) Field of Classification Search
CPC .......................................... G06Q 30/02–0277
See application file for complete search history.

(56) References Cited

U.S. PATENT DOCUMENTS

2011/0320273 A1* 12/2011 Miranda-Steiner .... G06Q 30/02
705/14.49

FOREIGN PATENT DOCUMENTS

WO WO-2017054708 A1 * 4/2017

OTHER PUBLICATIONS ip.com You Recommend, I buy: How and Why People Engage in Instant Messaging based Social Commerce by Zhilong Cao et al. Oct. 31, 2020 (Year: 2020).*

* cited by examiner

*Primary Examiner* — Raquel Alvarez
(74) *Attorney, Agent, or Firm* — Haley Guiliano LLP

(57) ABSTRACT

Systems and methods are provided for presenting an advertisement to a first participant of a plurality of participants of a conversation based on interests of other participants of the conversation. The conversation is monitored and a profile of the first participant is accessed. An interest category of a first interest term included in the profile is identified. A second interest term is identified from a portion of the conversation provided by a second participant of the plurality of participants. In response to determining that the second interest term is different from the first interest term and that the second interest term is in the identified interest category, an advertisement matching the second interest term is identified and generated for presentation on user equipment of the first participant.

20 Claims, 7 Drawing Sheets

SYSTEMS AND METHODS FOR TARGETING ADVERTISEMENTS BASED ON CONVERSATIONS

BACKGROUND

The present disclosure is directed to systems and methods providing advertisements based on a conversation between participants, and, more particularly, for providing an advertisement to a particular participant of a conversation based on interests of other participants of the conversation.

SUMMARY

Users may be presented with advertisements ("ads") across a variety of websites and platforms. In one approach, ads are targeted to particular users based on demographics, location, behavior (e.g., browsing behavior, device usage, etc.), user interests, etc. (e.g., targeted advertising). For example, in one approach, to target particular users with relevant ads, advertisers may access or maintain user profiles associated with particular users and select personalized ads based on the profiles. Additionally, in some approaches, ads may be targeted based on the content of a website or media asset a user is currently consuming.

In some cases, when a particular user is having a conversation with other users in a group (e.g., a group of friends), the interests of the particular user may be influenced by dissimilar interests expressed by other participants of the conversation. However, in current approaches, because ads are not targeted to a particular user based on dissimilar interests expressed by other users, targeted ads may not reflect changing interests of a particular user.

Accordingly, to solve these problems, systems and methods are provided for providing an ad to a particular participant of a conversation based on dissimilar interests expressed by other participants during a conversation with the particular user. In particular, a content recommendation application may monitor a conversation between a plurality of participants of the conversation; access a profile of a first participant of the plurality of participants, the profile including a first interest term associated with the first participant; and identify an interest category of the first interest term. The content recommendation application may identify, from a portion of the conversation provided by a second participant of the plurality of participants, a second interest term. In response to determining that the second interest term is different from the first interest term and that the second interest term is in the same interest category as the first interest term, the content recommendation application may identify a content item (e.g., an ad) matching the second interest term, and generate for presentation, at user equipment associated with the first participant, the identified content item.

In some embodiments, the conversation corresponds to a conversation on a text messaging platform or a conversation captured by a microphone.

In some embodiments, the conversation corresponds to a conversation on a group watch platform during a group watch session where a same media asset is simultaneously displayed at the user equipment associated with the first participant and at respective user equipment of each of the other participants of the plurality of participants.

In some embodiments, the identified content item may be an advertisement, and the content recommendation application, when generating for presentation, at the user equipment associated with the first participant, the identified content item, may identify an upcoming advertisement slot in the media asset being displayed on the user equipment associated with the first participant, and generate for presentation during the identified upcoming advertisement slot, at the user equipment associated with the first participant, the advertisement.

In some embodiments, the content recommendation application may identify the first participant, determine whether the profile of the first participant is stored in a database, and in response to determining that the profile of the first participant is not stored in the database, generate, at the beginning of the conversation, a temporary profile of the first participant.

In some embodiments, the content recommendation application may identify a new interest term, from a portion of the conversation provided by the first participant, that is not included the temporary profile of the first participant, and update the temporary profile of the first participant to include the new interest.

In some embodiments, the content recommendation application, when identifying the second interest term, may identify the portion of the conversation provided by the second participant, and parse the identified portion of the conversation provided by the second participant to identify the second interest term that is different from the first interest term. In some embodiments, the second interest term may include at least one keyword, and the second interest term may not match any interest terms stored in the profile of the first participant.

In some embodiments, the content recommendation application, when identifying the content item matching the second interest term, may compare the second interest term with metadata associated with a plurality of content items, and select, based on the comparing, a content item of the plurality of content items as the identified content item.

In some embodiments, the content recommendation application may infer a new interest term associated with the second interest term and update the profile of the first participant to include the new interest term.

In some embodiments, the identified content item may be a content item comparing the first interest term and the second interest term.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
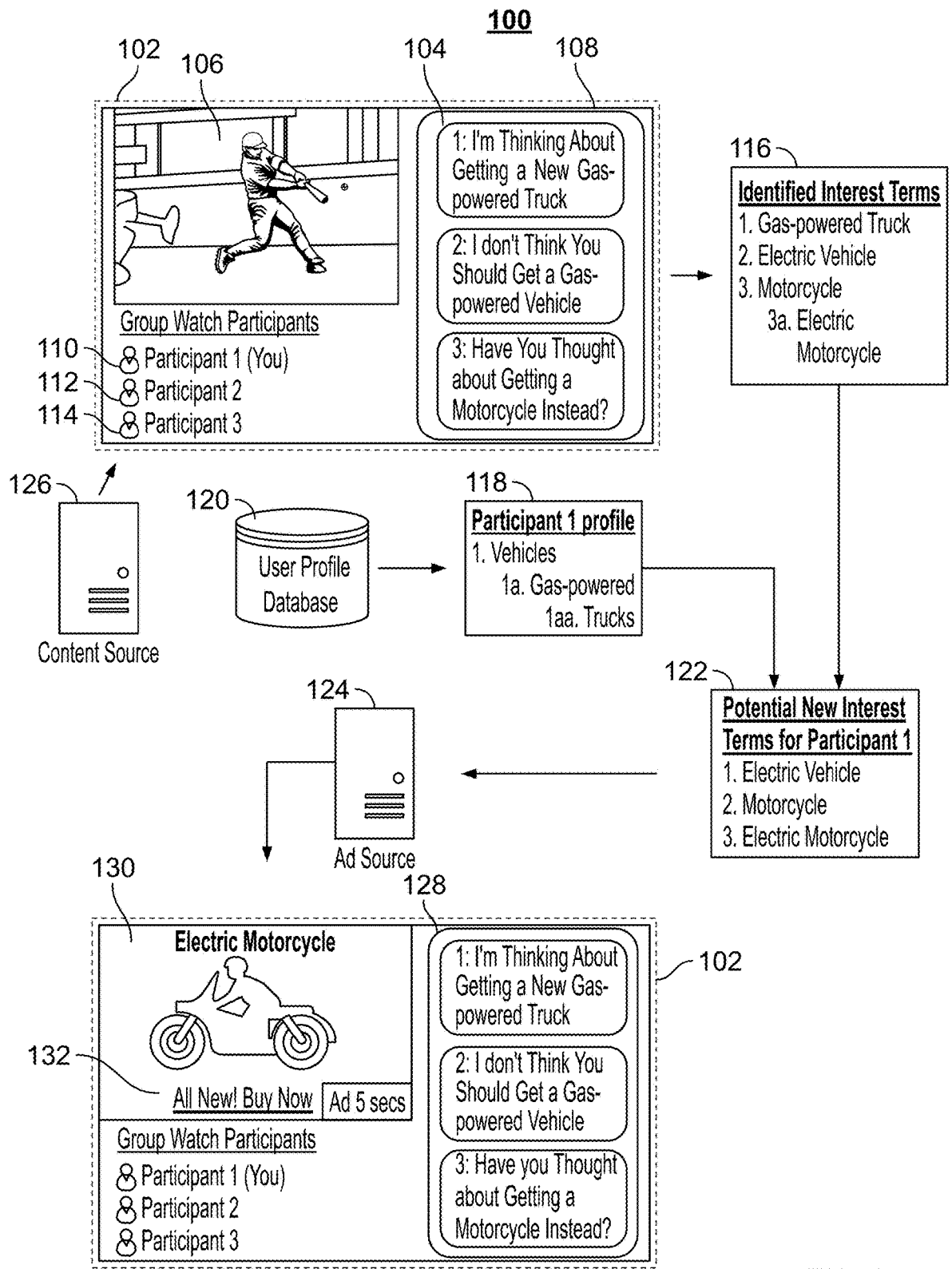
FIG. 1 shows an illustrative system for monitoring a conversation between a plurality of participants on a group watch platform and providing content to a particular participant of the conversation based on interests of other participants of the conversation, in accordance with some embodiments of the present disclosure.

FIG. 1 shows an illustrative system 100 for monitoring a conversation between a plurality of participants on a group watch platform and providing content to a particular participant of the conversation based on interests of other participants of the conversation, in accordance with some embodiments of the present disclosure. The system 100 shows a view of user equipment 102 (e.g., a television, mobile device, phone, tablet, computer, or any other suitable computing device) of a first participant 110 of a conversation 108 between a plurality of participants 110, 112, 114. The user equipment 102 is depicted as a television, but may be any user equipment with any functionality described below with respect to at least FIGS. 2-4. The user equipment 102 may comprise control circuitry (also described in further detail with respect to at least FIG. 4), which executes a content recommendation application. The user equipment 102 may include a graphical user interface (GUI), which may include one or more GUIs 104, 128 enabling users to interact with a content recommendation application. The user equipment 102, user profile database 120, ad source 124, and content source 126 may be communicatively coupled via a network (e.g., network 426 of FIG. 4). In some embodiments, the user profile database 120 may be included in any of the content source 126, the ad source 124, user equipment 403, and/or the server 401 of FIG. 4.

As shown, the first participant 110 may participate in a group watch session (e.g., on a group watch platform) with a second participant 112 and a third participant 114. For example, the first participant 110 may be viewing a group watch session GUI 104 provided by the content recommendation application on the user equipment 102. During the group watch session, each of the participants 110, 112, 114 may view the same media asset 106 (e.g., provided by the content source 126) on their respective user equipment and communicate with each other using a chat application provided by the group watch platform. For example, the first participant 110 may communicate with the second and third participants 112, 114 using the chat application included in the group watch session GUI 104.

In the embodiment of FIG. 1, the first participant 110 begins the conversation 108 by stating, "I'm thinking about getting a new gas-powered truck." The second participant 112 responds with, "I don't think you should get a gas-powered vehicle." The third participant 114 then asks, "Have you thought about getting a motorcycle instead?" The content recommendation application may process the conversation 108 in real time (e.g., using a natural language processing application) to identify interest terms 116 in the conversation 108. For example, the content recommendation application may identify "gas-powered truck" from the portion of the conversation 108 provided by the first participant 110. The content recommendation application may identify "electric vehicle" from the portion of the conversation 108 provided by the second participant 112. For example, although the portion of the conversation 108 does not actually include "electric vehicle" the content recommendation application may infer "electric" by recognizing a distaste of the second participant 112 for "gas-powered vehicles" (e.g., "I don't think [you should get a gas-powered vehicle]"). The content recommendation application may identify "motorcycle" from the portion of the conversation 108 provided by the third participant 114. Additionally, the content recommendation application may also infer additional sub-categories of motorcycles based on sentiment (e.g., negative, positive, or neutral) assigned to certain interest terms for certain participants. For example, the content recommendation application may determine "electric motorcycles" as one of the identified interest terms 116 (e.g., instead of "gas-powered motorcycles") based on a negative sentiment assigned to "gas-powered vehicles" for the second participant 112).

The content recommendation application may retrieve a user profile 118 of the first participant 110 from the user profile database 120. The user profile 118 may indicate, e.g., various interest terms associated with interests of the first participant 110. The interest terms may be determined based on, e.g., past conversations of the first participant 110, various interests of the first participant 110, a viewing history of the first participant 110, a browsing history of the first participant 110, social media interactions of the first participant 110, a purchase history of the first participant 110, etc. In some embodiments, interest terms may be arranged in a hierarchy of topics and subtopics. For example, as shown, the user profile 118 may include a first interest term, "vehicles," which is also a topic. The user profile may further include sub-topics "gas-powered" (e.g., vehicles that are gas-powered) and "trucks" (e.g., vehicles that are gas-powered trucks).

The content recommendation application may compare the identified interest terms 116 with interest terms included in the user profile 118 to determine if any of the identified interest terms 116 (e.g., provided by other participants) are different from the interest terms included in the user profile 118. For identified interest terms 116 determined to not be included in the user profile 118 (e.g., "electric vehicle," "motorcycle," and "electric motorcycle"), the content recommendation application may determine if any of the identified interest terms 116 are associated with an interest category included in the user profile 118. For example, the content recommendation application may determine that each of the terms "electric vehicle," "motorcycle," and "electric motorcycle" are associated with "vehicles" (e.g., an interest category included in the user profile 118), and identify each of these terms as potential new interest terms 122 for the first participant 110.

The content recommendation application may identify (e.g., at the ad source 124) a content item (e.g., an ad 130) matching one or more of the potential new interest terms 122. In some embodiments, the ad source 124 may be implemented as a server, and the content recommendation application may transmit the potential new interest terms 122 to the ad source 124. Although all of the potential new interest terms 122 are shown as being transmitted to the ad source 124 (e.g., included in a query to the ad source 124), the content recommendation application may select one or more of the potential new interest terms 122 to transmit to the ad source 124 based on a variety of factors such as the scope of each interest term, demographic information of the first participant 110, group sentiment of each interest term, etc.

The content recommendation application may identify (e.g., at the ad source 124) a content item (e.g., the ad 130) matching one of the potential new interest terms 122. For example, the content recommendation application may compare the potential new interest terms 122 to metadata associated with a plurality of ads stored in the ad source 124. In one embodiment, the ad source 124 may use real-time bidding (RTB) to identify an ad. For example, different advertisers may bid for an ad spot to be displayed by the user equipment 102 of the first participant 110, based on the potential new interest terms 122. For example, in response to an advertiser winning the bid for the ad spot based on "electric motorcycle," the content recommendation application may select the ad of the advertiser (e.g., the ad 130) matching the interest term "electric motorcycle." In some embodiments, the content recommendation application may select an ad having the closest match to one of the potential new interest terms 122. In some embodiments, the content recommendation application may select an ad based on a location of the first participant 110. For example, if the content recommendation application determines that the first participant 110 is near a location associated with an ad (e.g., an electric motorcycle dealer advertising an electric motorcycle), the content recommendation application may select the ad to display in the ad spot. In some embodiments, if the content recommendation application determines that an ad is already scheduled for the next ad spot to be displayed by the user equipment 102 of the first participant 110, the content recommendation application may determine if the scheduled ad is related to one of the identified interest terms 116. If the scheduled ad is related to one of the identified interest terms 116, the content recommendation application may select an ad for a subsequent ad spot. Otherwise, the content recommendation application may replace the scheduled ad with the selected ad. For example, as shown, the content recommendation application may identify the ad 130 (e.g., for an electric motorcycle) as the ad matching "electric motorcycle." Additionally, in some embodiments, scheduled ad(s) may be swapped for one participant but not for the others since the content recommendation application might not have inferred any new interests for the other participants. References to the new ads can be inserted in an updated manifest and sent to the specific participant/video player, or the player can be automatically redirected to the location of the new ads when it makes a request to fetch the old ad.

In response to identifying the ad 130, the content recommendation application may display the ad 130 to the first participant 110. For example, as shown, GUI 128 may be generated for presentation to the first participant 110 on the user equipment 102. In some embodiments, the ad 130 may be displayed during a scheduled ad slot (e.g., during the display of the media asset 106). However, this is only an example, and the ad 130 may be displayed as a banner ad in the GUI 128 or in any suitable manner on user equipment associated with the first participant 110. During the scheduled ad slot, the other participants 112, 114 may be presented with different ads than the ad 130. In some embodiments, the ad 130 may include a user-selectable link 132 associated with the ad 130 (e.g., a URL to a website associated with the ad 130). In some embodiments, the content recommendation application may add one or more of the potential new interest terms 122 to the user profile 118.

In some embodiments, during a group conversation between a plurality of participants, some of the plurality of participants may also engage in one or more side-chats (e.g., a private conversation that excludes at least one of the plurality of participants of the group conversation). For example, in the embodiments of FIG. 1, the first and second participants 110 and 112 may engage in a side-chat. In some embodiments, the side-chat may include participants not included in the group conversation. In some embodiments, it may be advantageous for the content recommendation to also monitor the side-chat and update the user profile 118 of the first participant 110 in a similar manner as described above with reference to the group conversation 108 so that the user profile 118 is kept up to date. In some embodiments, side-chats may be conducted on a different chat application than the chat application of the group conversation.

Figure 3:
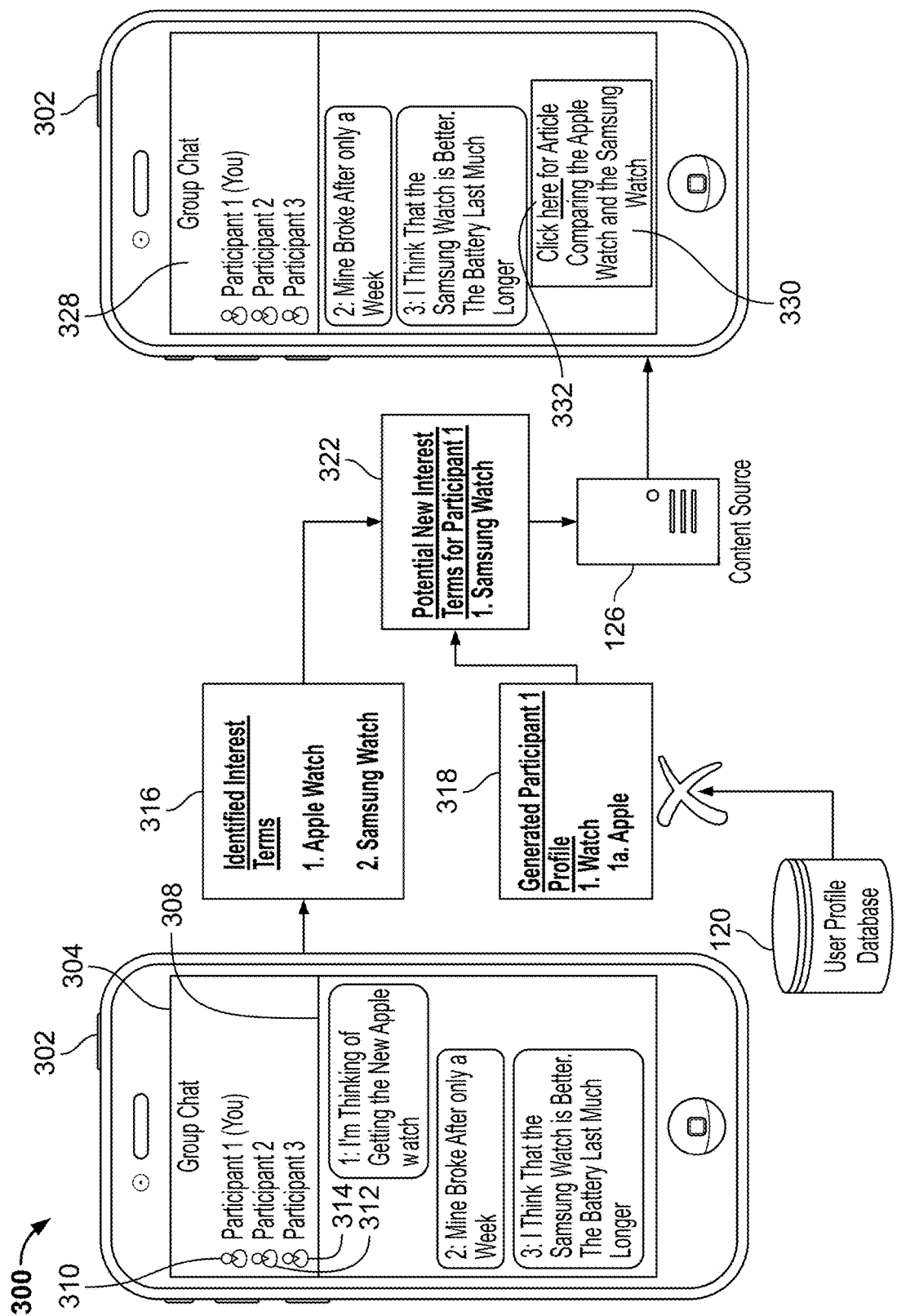
FIG. 3 shows an illustrative system for monitoring a conversation between a plurality of participants on a text messaging application and providing content to a particular participant of the conversation based on interests of other participants of the conversation, in accordance with some embodiments of the present disclosure.
Figure 4:
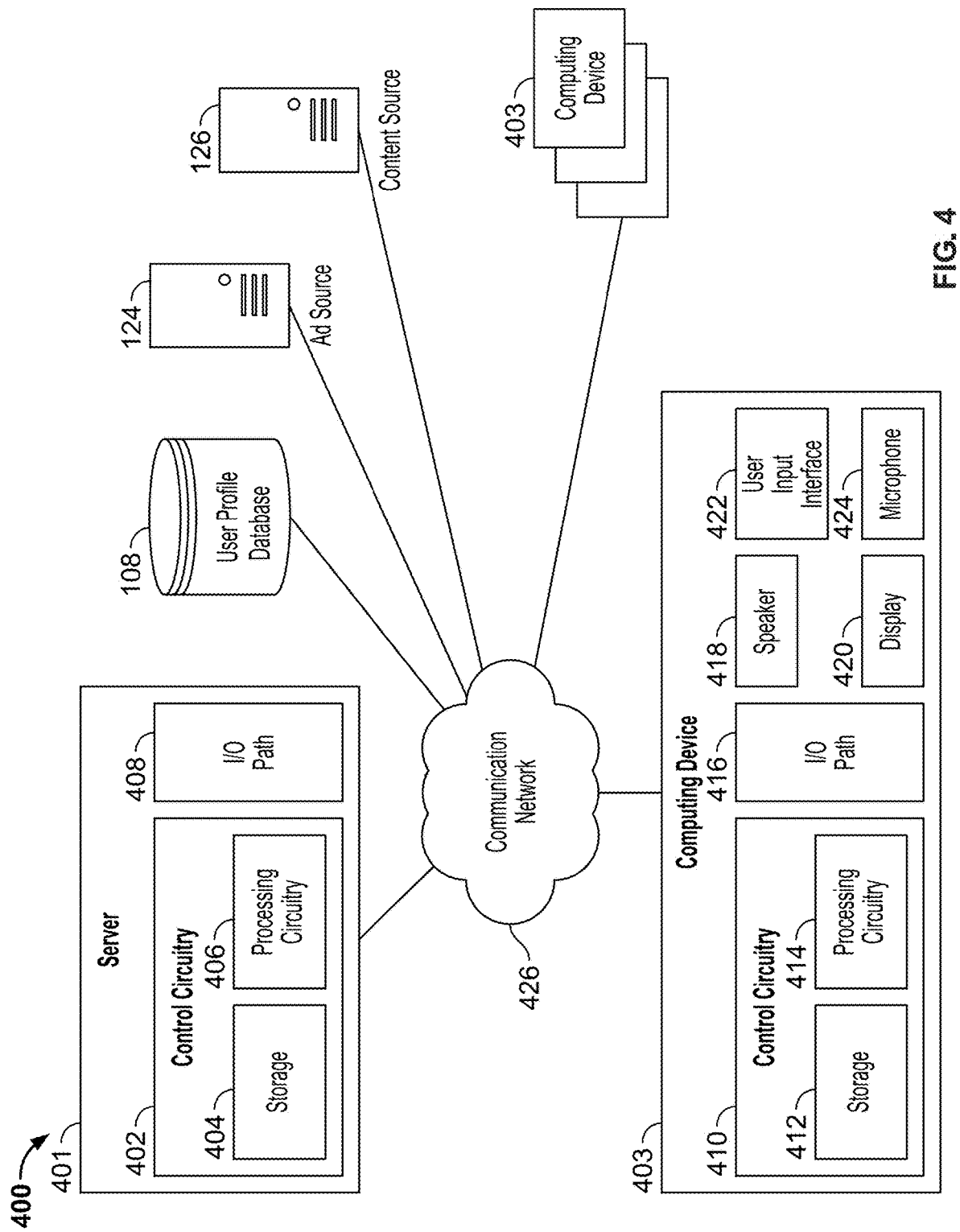
FIG. 4 shows an illustrative block diagram showing additional details of the systems of FIGS. 1, 2, and/or 3, in accordance with some embodiments of the disclosure.

Although a particular conversation 108 between three participants 110, 112, 114 on a group watch platform on the user equipment 102 is shown in the embodiments of FIG. 1, conversations may include group conversations where two or more participants are engaging with each other, such as social media postings, text message conversations, or in-person conversations (e.g., captured by the microphone 424 of FIG. 4). In the embodiment of FIG. 1, the three-participant conversation 108 is taking place via a chat application included in the group watch platform on the user equipment 102 of the first participant 110, although it will be understood that conversations may take place on a variety of suitable user devices as described herein, as well as on a variety of platforms or applications such as text messaging, personal assistants, media guidance, social media with public or group postings, video-conferences, video streams or recordings, personal or vehicle navigation, or any other suitable application that provides an opportunity for a participant to engage with other participants. For example, as described below with reference to FIGS. 2 and 3, conversations may take place via a text messaging application on smartphones.

Figure 2:
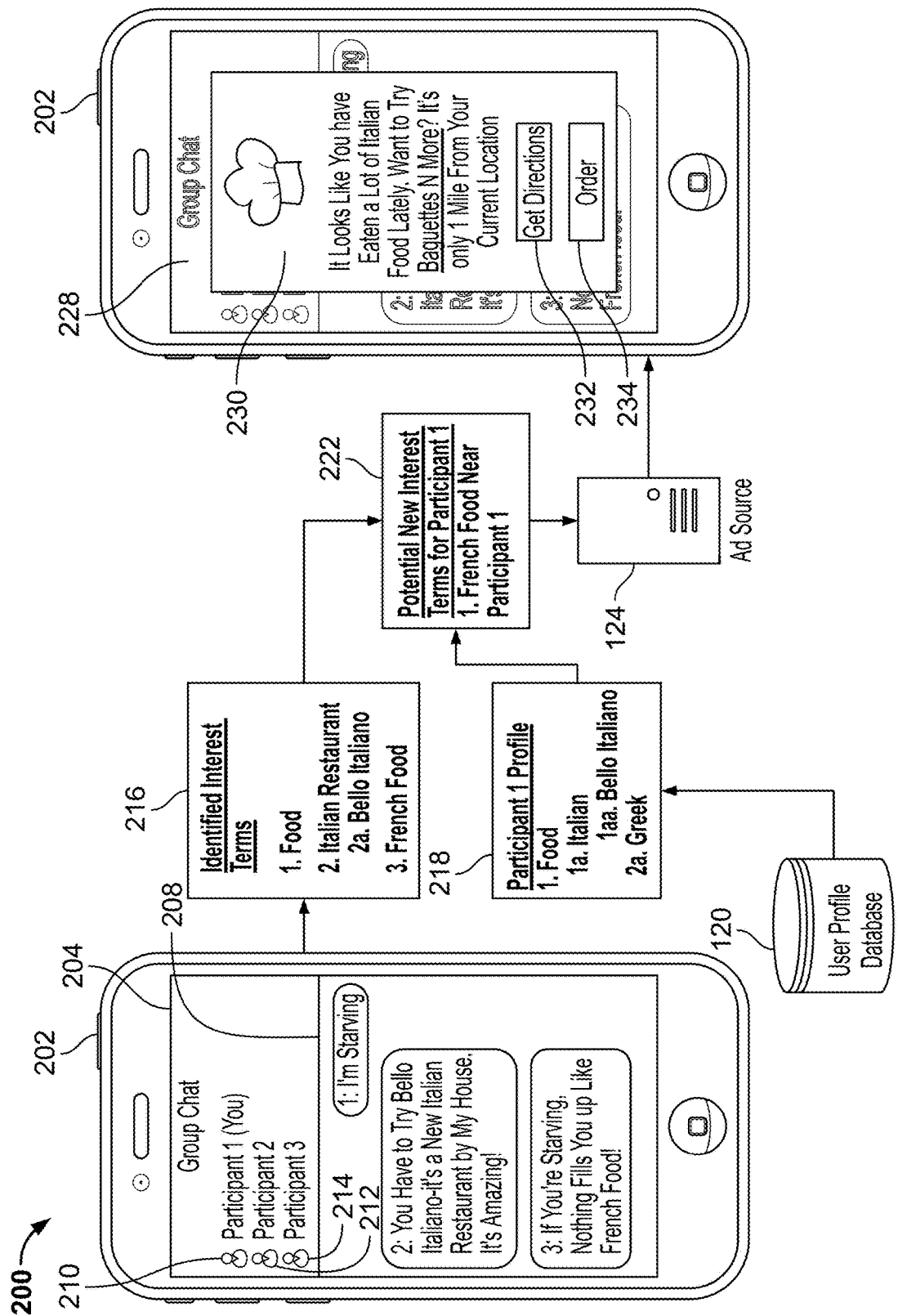
FIG. 2 shows an illustrative system for monitoring a conversation between a plurality of participants on a text messaging application and providing content to a particular participant of the conversation based on interests of other participants of the conversation, in accordance with some embodiments of the present disclosure.

FIG. 2 shows an illustrative system 200 for monitoring a conversation between a plurality of participants on a text messaging application and providing content to a particular participant of the conversation based on interests of other participants of the conversation, in accordance with some embodiments of the present disclosure. The system 200 shows a view of user equipment 202 of a first participant 210 of a conversation 208 between a plurality of participants 210, 212, 214. The user equipment 202 is depicted as a smartphone, but may be any user equipment with any functionality described above or below with respect to at least FIGS. 1, 3, and 4. As similarly described with reference to FIG. 1, the user equipment 202 may comprise control circuitry (also described in further detail with respect to at least FIG. 4), which executes the content recommendation application. Elements of the system 200 may correspond to elements of the system 100 and are not described again in detail.

In the embodiment of FIG. 2, the first participant 210 may participate in a group chat (e.g., on a text messaging application) with a second participant 212 and a third participant 214 using the text messaging application GUI 204. The first participant 210 begins the conversation 208 by stating, "I'm starving." The second participant 212 responds with, "You have to try Bello Italiano—it's a new Italian restaurant by my house. It's amazing!" The third participant 214 then states, "If you're starving, nothing fills you up like French food!" As similarly described with reference to FIG. 1, the content recommendation application may process the conversation 208 in real-time (e.g., using a natural language processing application) to identify interest terms 216 in the conversation 208. For example, from the statement "I'm starving," the content recommendation application may determine that the first participant is likely interested in food and infer "food" from the portion of the conversation 208 provided by the first participant 210 as an interest term. The content recommendation application may identify "Bello Italiano" and "Italian restaurant" from the portion of the conversation 208 provided by the second participant 212. In some embodiments, the content recommendation application may also assign a positive sentiment to "Bello Italiano" and "Italian restaurant" for the second participant 212. The content recommendation application may identify "French food" from the portion of the conversation 208 provided by the third participant 214. In some embodiments, the content recommendation application may also assign a positive sentiment to "French food" for the third participant 214.

The content recommendation application may retrieve a user profile 218 of the first participant 210 from the user profile database 120. As described above with reference to FIG. 1, the user profile 218 may indicate, e.g., various interest terms associated with interests of the first participant 210. As shown, the user profile 218 may include a first interest term, "Food," which is also a topic. In some embodiments, topics may be generated for interest terms included in a user profile. The user profile 218 may further include sub-topics "Italian" and "Greek," and sub-sub-topic "Bello Italian" (under "Italian").

The content recommendation application may compare the identified interest terms 216 with interest terms included in the user profile 218 to determine if any of the identified interest terms 216 (e.g., provided by other participants) are different from the interest terms in the user profile 218 (e.g., not included). For interest terms determined to not be included in the user profile 218 (e.g., "French food"), the content recommendation application may determine if the interest terms are associated with an interest category included in the user profile 218. For example, the content recommendation application may determine that the interest term "French food" is associated with "Food" (e.g., an interest category included in the user profile 218) and identify this term as a potential new interest term 222 for the first participant 210.

The content recommendation application may identify (e.g., at the ad source 124) an ad (e.g., ad 230) from the ad source 124 based on the new interest term 222. For example, the content recommendation application may obtain the location of the first participant 210 (e.g., using GPS location information from the user equipment 202) and identify the ad 230 for "French food" near a current location of the first participant 210. For example, the content recommendation application may identify the ad 230 for a French restaurant one mile from the current location of the first participant 210.

In response to identifying the ad 230, the content recommendation application may display the ad 230 to the first participant 210. For example, as shown, GUI 228 may be generated for presentation to the first participant 210 on the user equipment 202. In some embodiments, the ad 230 may include user-selectable links 232, 234 for getting directions to or ordering food from "Baguettes N More." In some embodiments, if the first participant 210 selects one of the user-selectable links 232, 234, the content recommendation application may add "French food" and "Baguettes N More" to the user profile 218 as new interest terms (e.g., to be used in future advertising). In some embodiments, if the first participant 210 dismisses the ad 230, the content recommendation application may refrain from adding "French food" or "Baguettes N More" to the user profile 218. In some embodiments, if the ad 230 comprises an ad for a product that the first participant 210 is likely to only purchase once (e.g., a baguette oven), the content recommendation application may track new purchases by the first participant 210. If the content recommendation application determines that the first participant 210 purchases the advertised product, the content recommendation application may remove the interest terms added to the user profile 218 so that the same ad (or similar ad) is not shown again. In some embodiments, the content recommendation application may identify new interest terms based on the purchase (e.g., "baguette flour") and add these new interest terms to the user profile 218.

FIG. 3 shows an illustrative system 300 for monitoring a conversation between a plurality of participants on a text messaging application and providing content to a particular participant of the conversation based on interests of other participants of the conversation, in accordance with some embodiments of the present disclosure. The system 300 shows a view of user equipment 302 of a first participant 310 of a conversation 308 between a plurality of participants 310, 312, 314. The user equipment 302 is depicted as a smartphone, but may be any user equipment with any functionality described above or below with respect to at least FIGS. 1, 2, and 4. Elements of the system 300 may correspond to elements of the systems 100, 200 and are not described again in detail.

In the embodiment of FIG. 3, the first participant 310 may participate in a group chat (e.g., on a text messaging application) with a second participant 312 and a third participant 314 using the text messaging application GUI 304, as similarly described above with reference to FIG. 2. The first participant 310 begins the conversation 308 by stating, "I'm thinking of getting the new Apple watch." The second participant 312 responds with, "Mine broke after only a week." The third participant 314 then states, "I think that the Samsung watch is better." As similarly described with reference to FIGS. 1 and 2, the content recommendation application may process the conversation 308 in real-time (e.g., using a natural language processing application) to identify interest terms 316 in the conversation 308. For example, from the statement "I'm thinking of getting the new Apple watch," the content recommendation application may identify "Apple watch" and assign a positive sentiment to "Apple watch" for the first participant 310. The content recommendation application may determine that the second participant 312 is referencing the "Apple watch" from the portion of the conversation 308 provided by the second participant and assign a negative sentiment to "Apple watch" for the second participant 312. The content recommendation application may identify "Samsung watch" from the portion of the conversation 308 provided by the third participant 314 and assign a positive sentiment to "Samsung watch" for the third participant 314. In some embodiments, the content recommendation application may also assign a negative sentiment to "Apple watch" for the third participant 314. In some embodiments, negative sentiments may be reflected in a user profile as learned disinterests or pet peeves for a participant. For example, although a user profile of the third participant 314 may indicate an interest in smart watches, the user profile of the third participant 314 may also indicate a disinterest in Apple watches. Thus, in some embodiments, the third participant 314 could be shown ads based on both their learned interests and leaned disinterests.

The content recommendation application may attempt to retrieve a profile of the first participant 310 from the user profile database 120. If, however, the content recommendation application is unable to locate a user profile of the first participant 310, the content recommendation application may generate a user profile 318 for the first participant 310. In some embodiments, the content recommendation application may generate the user profile 318 at the start of the conversation 308. The content recommendation application may populate the user profile 318 with the identified interest term "Apple watch," from the portion of the conversation 308 provided by the first participant 310.

The content recommendation application may compare the identified interest terms 316 with interest terms included in the generated user profile 318 to determine if any of the identified interest terms 316 (e.g., provided by other participants) are different from the interest terms in the generated user profile 318 (e.g., not included). For interest terms determined to not be included in the user profile 318 (e.g., "Samsung watch"), the content recommendation application may determine if the interest terms are associated with an interest category included in the user profile 318. For example, the content recommendation application may determine that the interest term "Samsung watch" is associated with "watch" (e.g., an interest category added to the generated user profile 318) and identify this term as a potential new interest term 322 for the first participant 310.

The content recommendation application may determine, from the user sentiments assigned to the identified interest terms 316 of the conversation 308, that the first participant 310 may be interested in a comparison of the "Apple watch" and the "Samsung watch." In response to such a determination, the content recommendation application may identify, at the content source 126, an article comparing the "Apple watch" and the "Samsung watch." In response to identifying the article, the target application may generate an ad 330 including a link 332 to the article comparing the "Apple watch" and the "Samsung watch." For example, as shown, GUI 328 may be generated for presentation to the first participant 310 on the user equipment 302. In some embodiments, as shown, the ad 330 may be displayed like a message in the text application so that the first participant 310 may continue the conversation 308 without interruption or return later to read the article. In some embodiments, the article (e.g., content item) may be automatically displayed on the GUI 328 (e.g., instead of displaying the ad 330).

In some embodiments, the content recommendation application may identify (e.g., on the user equipment 302) other group conversations that include at least one of the second and third participants 312, 314, and identify additional interest terms or user sentiments for interest terms to update the user profile 318 or to identify content items/ads to display in the current conversation (e.g., the conversation 308). In some embodiments, the content recommendation application may track (e.g., over time) user sentiments assigned to interest terms in the user profile 318 and update the interest terms based on changing user sentiments. For example, in response to determining that the first participant 310 is no longer interested in an "Apple watch," the content recommendation application may remove this interest term from the user profile 318.

FIG. 4 shows an illustrative block diagram showing additional details of the systems 100, 200, and/or 300 (FIGS. 1, 2, and 3), in accordance with some embodiments of the disclosure. In various embodiments, system 400 includes some components described above in connection with any of the systems 100, 200, and 300. Although FIG. 4 shows certain numbers of components, in various examples, the system 400 may include fewer than the illustrated components and/or multiples of one or more illustrated components. Server 401 includes control circuitry 402 and input/output (I/O) path 408, and the control circuitry 402 includes a storage 404 and processing circuitry 406. Computing device 403, which may correspond to any of the user equipment 102, 202, and 302 of FIGS. 1-3, may be a gaming device, such as a video game console, user television equipment such as a set-top box, user computer equipment, a wireless user communications device such as a smartphone device, or any device on which users can converse. The computing device 403 includes control circuitry 410, I/O path 416, a speaker 418, a display 420, a user input interface 422, and a microphone 424. As shown, multiple computing devices 403 (e.g., of each participant in a conversation) may be communicatively connected through communication network 426. The control circuitry 410 includes a storage 412 and processing circuitry 414. The control circuitry 402 and/or 410 may be based on any suitable processing circuitry such as processing circuitry 406 and/or 414. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of the storage 404, the storage 412, and/or storages of other components of system 400 (e.g., storages of the user profile database 120, the ad source 124, the content source 126 and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video recorders (DVRs, sometimes called personal video recorders, or PVRs), solid state devices, quantum storage devices, gaming consoles, gaming media, or any other suitable fixed or removable storage devices, and/or any combination of the same. Each of the storage 404, the storage 412, and/or storages of other components of system 400 may be used to store various types of content, metadata, ads, user profile data, and other types of data. Non-volatile memory may also be used (e.g., to launch a boot-up routine and other instructions). Cloud-based storage may be used to supplement the storages 404, 412 or instead of the storages 404, 412. In some embodiments, control the circuitry 402 and/or 410 executes instructions for an application (e.g., the content recommendation application) stored in memory (e.g., the storage 404 and/or 412). Specifically, the control circuitry 402 and/or 410 may be instructed by the content recommendation application to perform the functions discussed herein. In some implementations, any action performed by the control circuitry 402 and/or 410 may be based on instructions received from the content recommendation application. For example, the content recommendation application may be implemented as software or a set of executable instructions that may be stored in the storage 404 and/or 412 and executed by the control circuitry 402 and/or 410. In some embodiments, the content recommendation application may be a client/server application where only a client application resides on the computing device 403, and a server application resides on the server 401.

The content recommendation application may be implemented using any suitable architecture. For example, it may be a stand-alone application wholly implemented on the computing device 403. In such an approach, instructions for the content recommendation application are stored locally (e.g., in the storage 412), and data for use by the content recommendation application is downloaded on a periodic basis (e.g., from an out-of-band feed, from an Internet resource, or using another suitable approach). The processing circuitry 414 may retrieve instructions for the content recommendation application from the storage 412 and process the instructions to perform the functionality described herein. Based on the processed instructions, the processing circuitry 414 may determine what action to perform when input is received from the user input interface 422.

In client/server-based embodiments, the control circuitry 410 may include communication circuitry suitable for communicating with an application server (e.g., the server 401) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., the communication network 426). In another example of a client/server-based application, the control circuitry 410 runs a web browser that interprets web pages provided by a remote server (e.g., the server 401). For example, the remote server may store the instructions for the content recommendation application in a storage device. The remote server may process the stored instructions using circuitry (e.g., the control circuitry 402) and generate the displays discussed above and below. The computing device 403 may receive the displays generated by the remote server and may display the content of the displays locally via the display 420. This way, the processing of the instructions is performed remotely (e.g., by the server 401) while the resulting displays, such as the display windows described elsewhere herein, are provided locally on the computing device 403. The computing device 403 may receive inputs from the user via the user input interface 422 and transmit those inputs to the remote server for processing and generating the corresponding displays.

A user may send instructions to the control circuitry 402 and/or 410 using the user input interface 422. The user input interface 422 may be any suitable user interface, a keypad, keyboard, touchscreen, touchpad, stylus input, voice recognition interface, or other user input interfaces. The user input interface 422 may be integrated with or combined with display 420, which may be a monitor, a television, a liquid crystal display (LCD), an electronic ink display, or any other equipment suitable for displaying visual images.

The server 401 and the computing device 403 may receive content and data via the I/O paths 408 and 416, respectively. For instance, the I/O path 416 may include a communication port configured to receive a live content stream (e.g., media asset stream) from server 401 and/or content source 126 via a communication network 426. Storage 412 may be configured to buffer the received live content stream for playback, and display 220 may be configured to present the buffered content, navigation options, alerts, and/or the like via a primary display window and/or a secondary display window. The I/O paths 408, 416 may provide content (e.g., a live stream of content, video game content, broadcast programming, on-demand programming, Internet content, content available over a local area network (LAN) or wide area network (WAN), and/or other content) and data to the control circuitry 402, 410. The control circuitry 402, 410 may be used to send and receive commands, requests, and other suitable data using the I/O paths 408, 416. The I/O paths 408, 416 may connect the control circuitry 402, 410 (and specifically the processing circuitry 406, 414) to one or more communication paths (described below). I/O functions may be provided by one or more of these communication paths but are shown as single paths in FIG. 4 to avoid overcomplicating the drawing.

The ad source 124 and the content source 126 may include one or more types of content distribution equipment, including television distribution facility, cable system headend, satellite distribution facility, programming sources, etc. Content and/or data delivered to the computing device 403 may be over-the-top (OTT) content. OTT content delivery allows Internet-enabled user devices, such as the computing device 403, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 403. The ad source 124 and the content source 126 may be implemented by one or more servers (e.g., the server 401).

Figure 5:
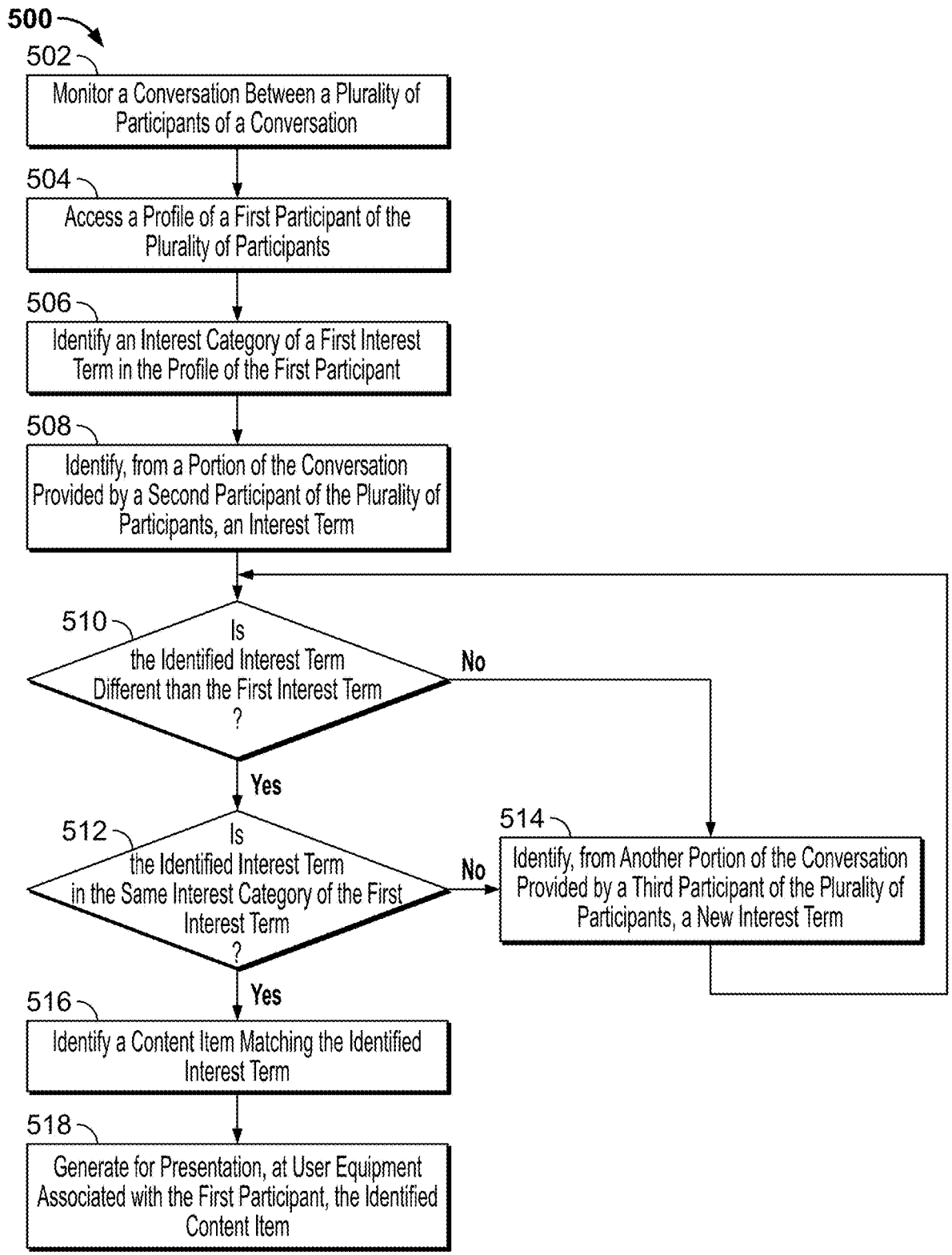
FIG. 5 depicts a flowchart of illustrative steps of a process for monitoring a conversation between a plurality of participants and providing content to a particular participant of the conversation based on interests of other participants of the conversation, in accordance with some embodiments of the present disclosure.

FIG. 5 depicts a flowchart of illustrative steps of a process 500 for monitoring a conversation between a plurality of participants and providing content to a particular participant of the conversation based on interests of other participants of the conversation, in accordance with some embodiments of the present disclosure. In various embodiments, individual steps of the process 500, or any process described herein, may be implemented by one or more components of system 400. Although the present disclosure may describe certain steps of the process 500 (and of other processes described herein) as being implemented by certain components of system 400 (e.g., the control circuitry 410), this is for purposes of illustration only, and it should be understood that other components of system 400 may implement those steps instead. It should be noted that the process 500, or any steps thereof, could be performed on, or provided by, any of the devices shown in FIGS. 1-4.

The process begins at step 502 when the content recommendation application (e.g., via the control circuitry 410) may monitor a conversation between a plurality of participants of a conversation. For example, the control circuitry 410 may monitor a conversation on a group watch platform during a group watch session (e.g., as shown in FIG. 1) or a conversation on a text messaging application on a smartphone (e.g., as shown in FIGS. 2 and 3). In some embodiments, the control circuitry 410 may monitor an in-person conversation (e.g., using the microphone 424 of FIG. 4).

Figure 6:
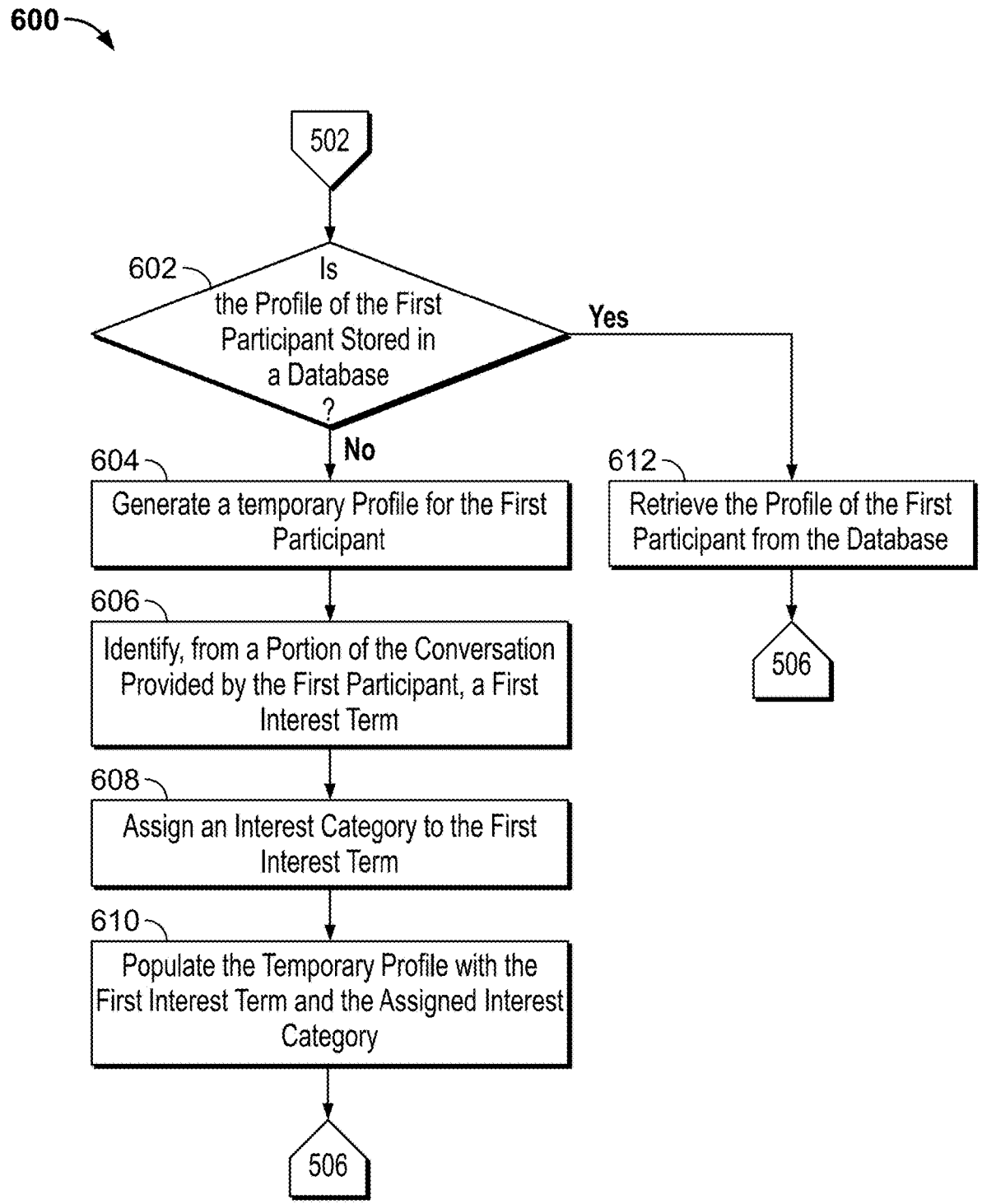
FIG. 6 depicts a flowchart of illustrative steps of a process for accessing a profile of a first participant of the plurality of participants, in accordance with some embodiments of the present disclosure.

At 504, the content recommendation application (e.g., via the control circuitry 410) may access a profile of a first participant of the plurality of participants of the conversation (e.g., as explained in greater detail in FIG. 6). For example, the control circuitry 410 may query a database (e.g., the user profile database 120) based on the identity of the first participant. In some embodiments, the identity of the first participant may be determined by the profile associated with the user equipment the first participant is participating in the conversation with (e.g., the user equipment 202 of FIG. 2) or a messaging application the first participant is using to participant in the conversation (e.g., group watch platform described with reference to FIG. 1). In some embodiments, the identity of the first participant may be determined using voice recognition techniques, facial recognition techniques, or any other suitable techniques.

At 506, the content recommendation application (e.g., via the control circuitry 410) may identify an interest category of a first interest term in the profile of the first participant. For example, with reference to FIG. 1, the control circuitry may identify "vehicle" as an interest category of "gas-powered truck" (e.g., a first interest term).

At 508, the content recommendation application (e.g., via the control circuitry 410) may identify, from a portion of the conversation provided by a second participant of the plurality of participants of the conversation, an interest term. For example, the control circuitry 410 may process the conversation in real time using a natural language processing application to identify interest terms (e.g., which may include one or more keywords). In some embodiments, the control circuitry 410 may infer certain interest terms based on the processed conversation. For example, with reference to FIG. 1, the control circuitry may identify "electric motorcycle" as an interest term.

At 510, the content recommendation application (e.g., via the control circuitry 410) may determine if the identified interest term is different from the first interest term. For example, with reference to FIG. 1, the control circuitry 410 may determine that "gas-powered truck" is different from "electric motorcycle." In response to determining that the identified interest term is not different from the first interest term ("No" at 510), the process 500 proceeds to 514. Otherwise ("Yes" at 510), the process 500 proceeds to step 512.

At 512, the content recommendation application (e.g., via the control circuitry 410) may determine if the identified interest term is in the same interest category as the first interest term (e.g., associated with the same topic). For example, with reference to FIG. 1, the control circuitry 410 may determine that "electric motorcycle" and "gas-powered truck" are in the same interest category (e.g., vehicles). In response to determining that the identified interest term is not in the same interest category as the first interest term ("No" at 512), the process 500 proceeds to 514. Otherwise ("Yes" at 512), the process 500 proceeds to step 516.

At 514, the content recommendation application (e.g., via the control circuitry 410) may identify, from another portion of the conversation provided by a third participant of the plurality of participants (e.g., or any participant other than the first participant), a new interest term. For example, the control circuitry 410 may identify the next interest term in the conversation and return to 510. That is, the control circuitry 410 may continue to monitor the conversation until an interest term that is different from the first interest term, but in the same interest category as the first interest term, is identified.

Figure 7:
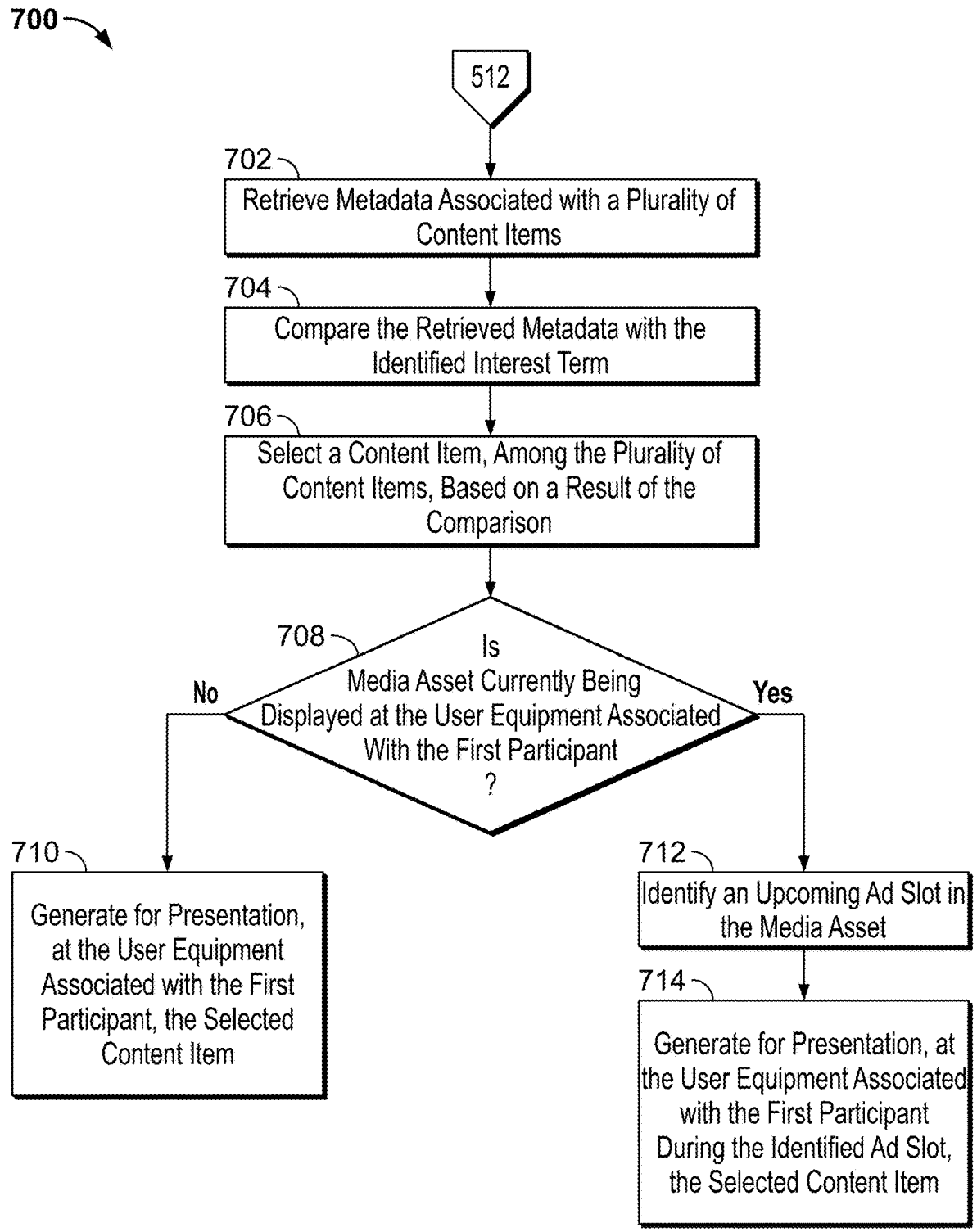
FIG. 7 depicts a flowchart of illustrative steps of a process for identifying a content item matching an identified interest term and generating the identified content item for presentation at user equipment associated with the first participant, in accordance with some embodiments of the present disclosure.

At 516, the content recommendation application (e.g., via the control circuitry 410) may identify a content item matching the identified interest term (e.g., as explained in greater detail in FIG. 7). For example, with reference to FIG. 1, the control circuitry 410 may identify an ad for an electric motorcycle.

At 518, the content recommendation application (e.g., via the control circuitry 410) may generate for presentation, at user equipment associated with the first participant (e.g., user equipment 102 of FIG. 1), the identified content item (e.g., as explained in greater detail in FIG. 7).

FIG. 6 depicts a flowchart of illustrative steps of a process 600 for accessing a profile of a first participant of the plurality of participants, in accordance with some embodiments of the present disclosure. The process 600 is one embodiment of a method for performing step 504 of FIG. 5 and begins after step 502. At step 602, the content recommendation application (e.g., via the control circuitry 410) may determine if the profile of the first participant is stored in a database (e.g., the user profile database 120). In response to determining that the profile of the first participant is not stored in the database ("No" at step 602), the process 600 proceeds to step 604. Otherwise ("Yes" at step 602), the process 600 proceeds to step 612.

At step 604, the content recommendation application (e.g., via the control circuitry 410) may generate a temporary profile for the first participant. In some embodiments, the control circuitry 410 may prompt the first participant to create a user profile.

At step 606, the content recommendation application (e.g., via the control circuitry 410) may identify, from a portion of the conversation provided by the first participant, a first interest term. For example, with reference to FIG. 3, the control circuitry 410 may identify "Apple watch" as the first interest term.

At step 608, the content recommendation application (e.g., via the control circuitry 410) may assign an interest category to the first interest term. For example, with reference to FIG. 3, the control circuitry may assign "watch" (e.g., an interest category) to the first interest term.

At step 610, the content recommendation application (e.g., via the control circuitry 410) may populate the temporary profile with the first interest term and the assigned interest category. The process 600 may then continue to step 506 of FIG. 5 with the temporary profile.

At step 612, in response to determining that the profile of the first participant is stored in the database, the content recommendation application (e.g., via the control circuitry 410) may retrieve the profile from the database. The process 600 may then continue to step 506 of FIG. 5 with the retrieved profile.

FIG. 7 depicts a flowchart of illustrative steps of a process 700 for identifying a content item matching an identified interest term and generating the identified content item for presentation at user equipment associated with the first participant, in accordance with some embodiments of the present disclosure. The process 700 is one embodiment of a method for performing steps 516 and 518 of FIG. 5 and begins after step 512. At step 702, the content recommendation application (e.g., via the control circuitry 410) may retrieve metadata associated with a plurality of content items. (e.g., describing each of the plurality of content items)

At step 704, the content recommendation application (e.g., via the control circuitry 410) may compare the retrieved metadata with the identified interest term.

At step 706, the content recommendation application (e.g., via the control circuitry 410) may select a content item, among the plurality of content items, based on a result of the comparison. For example, with reference to FIG. 1, the control circuitry may select an ad for an electric motorcycle in response to matching "electric motorcycle" (e.g., the identified interest term) to "electric motorcycle" (e.g., metadata describing the ad for an electric motorcycle).

At step 708, the content recommendation application (e.g., via the control circuitry 410) may determine if a media asset is currently being displayed at the user equipment associated with the first participant. For example, with reference to FIG. 1, the control circuitry 410 may determine if the media asset 106 is currently being displayed on the user equipment 102 during the group watch session. In response to determining that a media asset is not currently being displayed at the user equipment associated with the first participant ("No" at step 708), the process 700 proceeds to step 710. Otherwise ("Yes" at step 708), the process 700 proceeds to step 712.

At step 710, the content recommendation application (e.g., via the control circuitry 410) may generate for presentation, at the user equipment associated with the first participant, the selected content item.

At step 712, the content recommendation application (e.g., via the control circuitry 410) may identify an upcoming ad slot in the media asset.

At step 714, the content recommendation application (e.g., via the control circuitry 410) may generate for presentation, at the user equipment associated with the first participant during the identified ad slot, the selected content item. For example, with reference to FIG. 1, the control circuitry 410 may display the ad 130 for an electric motorcycle at the identified ad slot (e.g., commercial break) of the media asset.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   updating in a database, using control circuitry, a user profile of a first participant of a plurality of participants of a conversation by:
   identifying, using the control circuitry, a first portion of the conversation received from the first participant;
   identifying, using natural language processing by the control circuitry, a first interest term in the first portion of the conversation;
   accessing in the database the user profile of the first participant, and inferring, using natural language processing by the control circuitry, a topic of the first interest term in the user profile;
   identifying, a second portion of the conversation that is provided by a second participant of the plurality of participants;
   identifying a second interest term in the second portion of the conversation by determining that the second interest term is different from the first interest term;
   determining, using natural language processing by the control circuitry, that the second interest term is in the same identified topic in the user profile in the database as the first interest term;
   based at least in part on the determining that the second interest term is different from the first interest term and the determining that the second interest term is in the same topic as the first interest term, storing in the user profile of the first participant the second interest term from the second participant as a new interest term of the first participant,
   wherein in the database the user profile of the first participant is updated such that the second interest term is categorized in a hierarchy of the topic and a subtopic according to the topic of the first interest term;
   identifying a content item based on the updated user profile of the first participant by matching the second interest term; and
   generating for presentation, at user equipment associated with the first participant, the identified content item.

2. The method of claim 1, wherein the conversation corresponds to a conversation on a text messaging platform or a conversation captured by a microphone.

3. The method of claim 1, wherein the conversation corresponds to a conversation on a group watch platform during a group watch session, wherein during the group watch session, a same media asset is simultaneously displayed at the user equipment associated with the first participant and at respective user equipment of each of the other participants of the plurality of participants.

4. The method of claim 3, wherein the identified content item is an advertisement, and
   wherein the generating for presentation, at the user equipment associated with the first participant, the identified content item comprises:
   identifying an upcoming advertisement slot in the media asset being displayed on the user equipment associated with the first participant; and
   generating for presentation during the identified upcoming advertisement slot, at the user equipment associated with the first participant, the advertisement.

5. The method of claim 1, further comprising:
   determining whether the profile of the first participant is stored in a database; and
   in response to determining that the profile of the first participant is not stored in the database, generating, at the beginning of the conversation, a temporary profile of the first participant, wherein the accessing the profile of the first participant comprises accessing the temporary profile of the first participant.

6. The method of claim 5, wherein the method further comprises:
   identifying a new interest term, from a portion of the conversation provided by the first participant that is not included in the temporary profile of the first participant; and updating the temporary profile of the first participant to include the new interest term.

7. The method of claim 1, wherein the identifying the second interest term comprises:
identifying the portion of the conversation provided by the second participant; and
parsing the identified portion of the conversation provided by the second participant to identify the second interest term that is different from the first interest term,
wherein the second interest term comprises at least one keyword, and
wherein the second interest term does not match any interest terms stored in the profile of the first participant.

8. The method of claim 1, wherein the identifying the content item matching the second interest term comprises:
comparing the second interest term with metadata associated with a plurality of content items; and
selecting, based on the comparing, a content item of the plurality of content items as the identified content item.

9. The method of claim 1, further comprising:
inferring a new interest term associated with the second interest term; and
updating the profile of the first participant to include the new interest term.

10. The method of claim 1, wherein the identified content item is a content item comparing the first interest term and the second interest term.

11. The method of claim 1, further comprising:
identifying a third interest term in the second portion of the conversation by determining that the third interest term is different from the first interest term;
determining, using natural language processing by the control circuitry, that the third interest term is in the same identified interest topic in the user profile in the database as the first interest term and the second interest term;
determining, using natural language processing by the control circuitry, that the third interest term is associated with a negative sentiment;
based at least in part on the determining that the third interest term is different from the first interest term and determining that the third interest term is in the same interest topic as the first interest term and the second interest term, and based in part on the determining that the third interest term is associated with the negative sentiment, storing in the user profile of the first participant the third interest term as a new negative sentiment interest term of the first participant,
wherein the identifying of the content item is based on the new negative sentiment interest term of the first participant.

12. The method of claim 1, wherein the content item is a first content item, and further comprising:
detecting a request to retrieve a second content item;
wherein the identifying the first content item comprises substituting a request to retrieve the first content item for the request to retrieve the second content item.

13. A system comprising:
a memory storing instructions; and
control circuitry configured to execute the instructions stored in the memory to:
update in a database a user profile of a first participant of a plurality of participants of a conversation by:
identifying a first portion of the conversation received from the first participant;
identifying, using natural language processing, a first interest term in the conversation provided by the first participant;
accessing in the database the user profile of the first participant;
determining, using natural language processing, a topic of the first interest term in the user profile of the first participant;
identifying, using natural language processing, from a portion of the conversation provided by a second participant of the plurality of participants, a second interest term by determining that the second interest term is different from the first interest term;
determining, using natural language processing by the control circuitry, that the second interest term is in the same identified topic in the user profile as the first interest term;
based at least in part on the determining that the second interest term is different from the first interest term and the determining that the second interest term is in the same topic as the first interest term, storing in the user profile of the first participant the second interest term as a new interest term of the first user,
wherein in the database the user profile of the first participant is updated such that the second interest term is categorized in a hierarchy of the topic and a subtopic according to the topic of the first interest term;
identify a content item based on the updated user profile of the first participant by matching the second interest term; and
generate for presentation, at user equipment associated with the first participant, the identified content item.

14. The system of claim 13, wherein the conversation corresponds to a conversation on a text messaging platform or a conversation captured by a microphone.

15. The system of claim 13, wherein the conversation corresponds to a conversation on a group watch platform during a group watch session, wherein during the group watch session, a same media asset is simultaneously displayed at the user equipment associated with the first participant and at respective user equipment of each of the other participants of the plurality of participants.

16. The system of claim 15, wherein the identified content item is an advertisement, and
wherein the control circuitry is further configured, when generating for presentation, at the user equipment associated with the first participant, the identified content item, to:
identify an upcoming advertisement slot in the media asset being displayed on the user equipment associated with the first participant; and
generate for presentation during the identified upcoming advertisement slot, at the user equipment associated with the first participant, the advertisement.

17. The system of claim 13, wherein the control circuitry is further configured to:
determine whether the profile of the first participant is stored in a database; and
in response to determining that the profile of the first participant is not stored in the database, generate, at the beginning of the conversation, a temporary profile of the first participant, wherein the control circuitry is further configured, when accessing the profile of the first participant, to access the temporary profile of the first participant.

18. The system of claim 17, wherein the control circuitry is further configured to:
identify a new interest term, from a portion of the conversation provided by the first participant, that is not included in the temporary profile of the first participant; and
update the temporary profile of the first participant to include the new interest term.

19. The system of claim 13, wherein the control circuitry is further configured,
when identifying the second interest term, to:
identify the portion of the conversation provided by the second participant; and
parse the identified portion of the conversation provided by the second participant to identify the second interest term that is different from the first interest term,
wherein the second interest term comprises at least one keyword, and
wherein the second interest term does not match any interest terms stored in the profile of the first participant.

20. The system of claim 13, wherein the control circuitry is further configured, when identifying the content item matching the second interest term, to:
compare the second interest term with metadata associated with a plurality of content items; and
select, based on the comparing, a content item of the plurality of content items as the identified content item.

* * * * *